US006989200B2

(12) United States Patent
Byers et al.

(10) Patent No.: US 6,989,200 B2
(45) Date of Patent: Jan. 24, 2006

(54) CERAMIC TO NOBLE METAL BRAZE AND METHOD OF MANUFACTURE

(75) Inventors: Charles L. Byers, Canyon Country, CA (US); Guangqiang Jiang, Castaic, CA (US); Gary D. Schnittgrund, Granada Hills, CA (US)

(73) Assignee: Alfred E. Mann Foundation for Scientific Research, Santa Clarita, CA (US)

( * ) Notice: Subject to any disclaimer, the term of this patent is extended or adjusted under 35 U.S.C. 154(b) by 183 days.

(21) Appl. No.: 10/697,149

(22) Filed: Oct. 30, 2003

(65) Prior Publication Data

US 2005/0095442 A1    May 5, 2005

(51) Int. Cl.
| B32B 15/04 | (2006.01) |
| B32B 15/16 | (2006.01) |
| B23K 1/00 | (2006.01) |
| B23K 103/08 | (2006.01) |
| B23K 103/16 | (2006.01) |

(52) U.S. Cl. .................... 428/621; 428/632; 428/635; 428/661; 428/670; 428/680; 228/122.1; 228/124.6; 228/245; 228/246; 228/248.1; 228/262.1; 228/56.3

(58) Field of Classification Search ............ 228/122.1, 228/201, 124.5, 202, 124.6, 245, 248.1, 262.1, 228/246, 56.3; 428/621, 615, 632, 635, 640, 428/661, 670, 680
See application file for complete search history.

(56) References Cited

U.S. PATENT DOCUMENTS

| 3,594,895 | A |  | 7/1971 | Hill |
| 3,994,430 | A |  | 11/1976 | Cusano et al. |
| 5,028,495 | A | * | 7/1991 | Hirano et al. ............. 428/622 |
| 5,817,984 | A | * | 10/1998 | Taylor et al. ......... 174/152 GM |
| 5,871,513 | A | * | 2/1999 | Taylor et al. ............... 607/36 |
| 5,977,689 | A | * | 11/1999 | Neukermans ............... 310/324 |
| 6,008,980 | A | * | 12/1999 | Stevenson et al. .......... 361/302 |
| 6,153,966 | A | * | 11/2000 | Neukermans ............... 310/328 |
| 6,221,513 | B1 |  | 4/2001 | Lasater |
| 6,521,350 | B2 |  | 2/2003 | Fey et al. |
| 6,586,675 | B1 | * | 7/2003 | Bealka et al. ............ 174/50.56 |
| 6,722,002 | B1 | * | 4/2004 | Chang et al. ............... 29/17.2 |
| 6,765,780 | B2 | * | 7/2004 | Brendel et al. ............ 361/302 |
| 2005/0075011 | A1 | * | 4/2005 | Canfield et al. |
| 2005/0103825 | A1 | * | 5/2005 | Jiang et al. |

FOREIGN PATENT DOCUMENTS

WO    WO 99/58332    11/1999

* cited by examiner

*Primary Examiner*—Deborah D. Jones
*Assistant Examiner*—Jason L. Savage
(74) *Attorney, Agent, or Firm*—Gary Schnittgrund

(57) ABSTRACT

The invention is a method of bonding a ceramic part to a metal part by heating a component assembly comprised of the metal part, the ceramic part, and a compatible interlayer material such as titanium-nickel alloy placed between the two parts and heated at a temperature that is greater than the eutectic temperature of the interlayer material, where alloys, intermetallics or solid solution formed between the metal part and the metal interlayer material, but that is less than the melting point of either the ceramic part or the metal part. The component assembly is held in intimate contact at temperature in a non-reactive atmosphere for a sufficient time to develop a hermetic and strong bond between the ceramic part and the metal part. The bonded component assembly is optionally treated with acid to remove unwanted materials, to assure a biocompatible component assembly for implantation in living tissue.

38 Claims, 2 Drawing Sheets

CERAMIC TO NOBLE METAL BRAZE AND METHOD OF MANUFACTURE

CROSS REFERENCE TO RELATED APPLICATION

This application is related to commonly assigned U.S. patent application Ser. No. 09/972,280, now U.S. Pat. No. 6,521,350.

FIELD OF THE INVENTION

This invention relates to a hermetically sealed ceramic to metal bond joint and method of producing the bond.

BACKGROUND OF THE INVENTION

Known methods of bonding a ceramic to a metal involve the use of interlayer materials which either melt at the bonding temperature, such as a braze, or which involve special coating processes for the material surfaces to be bonded, such as pre-coating the surfaces with an activating material. In some methods of bonding, an interlayer material having a composition that approximates the composition of the initial metal bonding surface is utilized, such as disclosed by Lasater (U.S. Pat. No. 6,221,513). Lasater discloses a method for forming a hermetically sealed bond for use in implantable medical devices. Hill (U.S. Pat. No. 3,594,895) discloses another approach to forming a ceramic to metal seal. Fey, et al. (U.S. Pat. No. 6,521,350) discloses the use of pure nickel or nickel alloy to bond titanium to a ceramic, such as alumina or zirconia.

Cusano (U.S. Pat. No. 3,994,430) discloses a method of directly bonding metal to ceramic substrates where a very thin layer of an interlayer material is placed between the metal and the ceramic to be bonded. The system is heated in an inert atmosphere to a temperature between the eutectic temperature of the interlayer material and the melting point of the metal. Cusano focuses on bonding copper to a ceramic substrate, such as alumina or beryllia.

In one application, it is desired to have a platinum eyelet attached to a titanium alloy end cap that is in turn bonded to a hollow ceramic tube, which is implantable in living tissue as, for example, a microstimulator or microsensor. The BION of Advanced Bionics Corporation is one such device. The inventors have demonstrated that welding creates cracks at the platinum eyelet and the titanium alloy end cap weld joint. Low tensile strength has been measured in these welded joints. Continuous welding yielded an average strength of 4.5 lbf; double pass continuous welding yielded 4.5 lbf; and single shot welding yielded 16.2 lbf.

A hermetic, strong end cap that is bonded to a ceramic is needed, especially for implantable components.

DETAILED DESCRIPTION OF THE PREFERRED EMBODIMENT

Figure 1:
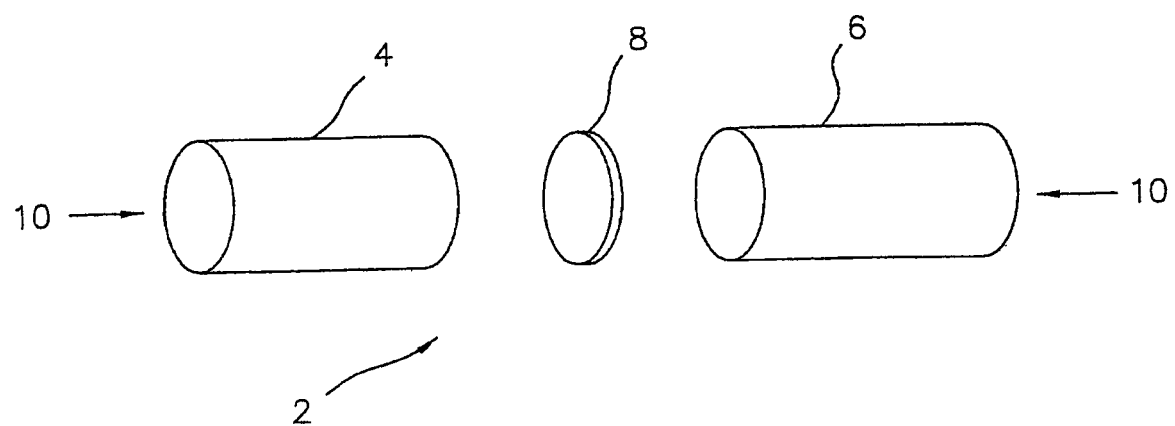
FIG. 1 illustrates the side view of the component assembly with the interlayer material as a foil between the ceramic and metal parts.

FIG. 1 shows component assembly 2 having metal part 4, ceramic part 6, and interlayer material 8. Component assembly 2 is heated to a specific process temperature, that is below the melting point of metal part 4, for a specific period of time, at a pressure that is created by force 10 and that is exerted to place interlayer material 8 in intimate contact with the metal and ceramic parts.

Interlayer material 8 is a foil having a thickness of 0.003 of an inch or less. The interlayer material 8 is preferably a clad foil comprised of at least one layer of nickel and one layer of titanium. Layering allows liquidus formation in the foil at a lower temperature than with an alloy of equivalent composition. In an alternative embodiment, the interlayer material 8 may be comprised of foil layers as a laminate of nickel and titanium that are in intimate contact, but that are not clad bonded to one another. In a further alternative embodiment, the interlayer material 8 is comprised of multiple foil layers of nickel and titanium. For simplicity, clad foil and layers are referred to as laminates herein.

Interlayer material 8 is selected from the group of materials that are compatible with the ceramic chosen for ceramic part 6 in that they wet the surface during the bonding process and chemically react with the ceramic part 6 thereby creating a strong bond joint during processing. Interlayer material 8 also is selected from the group of materials that are compatible with the metal chosen for metal part 4. Interlayer material 8 forms a bond with a metal part 4 by virtue of developing alloys, intermetallics or solid solution at the bonding temperature and pressure utilized during processing. The reaction products formed during processing is composed of the metal selected for metal part 4 and the metals selected for interlayer material 8. The group of interlayer materials includes titanium-nickel. In a preferred embodiment, interlayer material 8 is titanium-nickel foil having at least 50.0% and less than 67.0% of titanium with a thickness of approximately 0.002 inches.

Metal part 4 is a biocompatible material selected from the group of noble metals such as platinum, iridium, palladium, ruthenium, rhodium, or alloys thereof. A preferred embodiment is 90% by weight platinum and 10% iridium. Alternative embodiments include, but are not limited to, pure platinum, pure iridium, alloys of platinum and rhodium. Ceramic part 6 may be alumina, titania, zirconia, stabilized-zirconia, partially-stabilized zirconia, tetragonal zirconia polycrystal, tetragonal zirconia polycrystal, magnesia-stabilized zirconia, ceria-stabilized zirconia, yttria-stabilized zirconia, and calcia-stabilized zirconia, and in a preferred embodiment ceramic part 6 is tetragonal zirconia polycrystal. In alternative embodiments, rather than using interlayer material 8 as a foil, interlayer material 8 may be a thin coating that is applied to either the metal part 4 or ceramic part 6 surface to be bonded by any of a variety of chemical processes such as electroless plating and electroplating, or by any of a variety of thermal processes such as sputtering, evaporating, or ion beam enhanced deposition. In a preferred embodiment, the coating may be layers of nickel and titanium. Interlayer material 8 may also be applied as a thin coating of metallic beads or metallic powder. It is preferred that the beads or powder be comprised of separate beads of essentially pure titanium and pure nickel, to lower the liquidus formation temperature during brazing.

Figure 2:
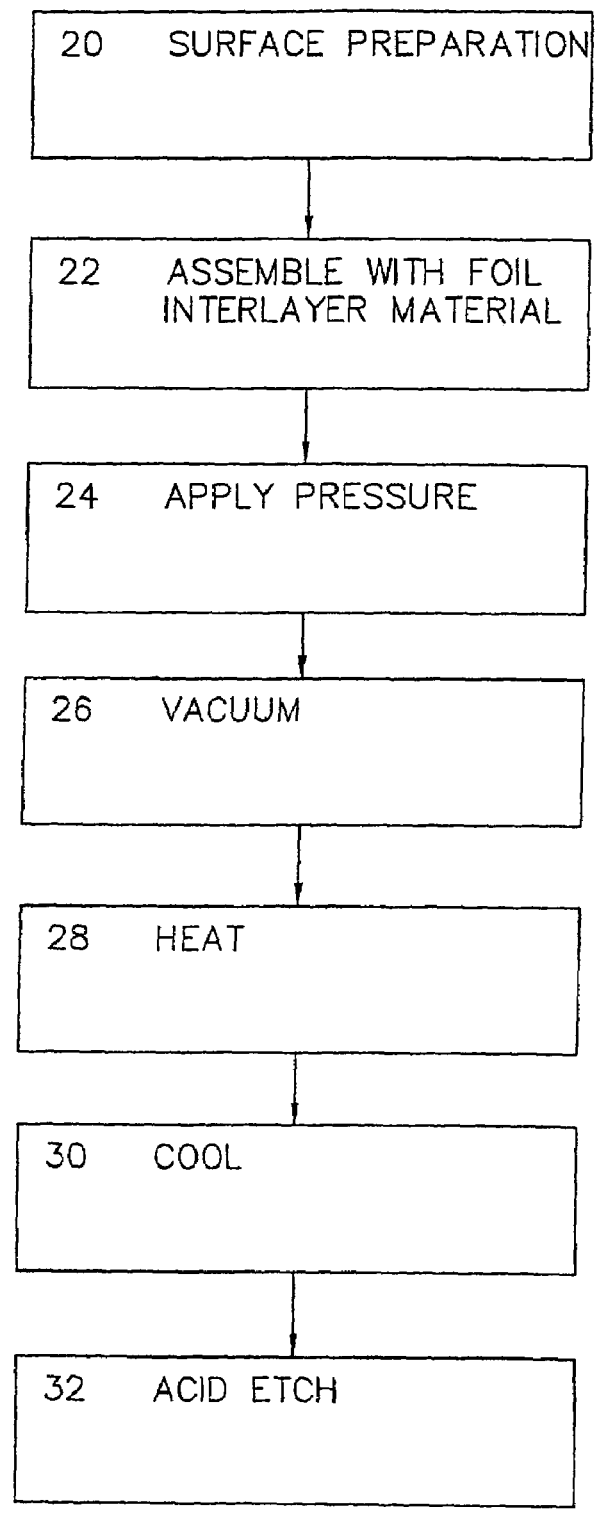
FIG. 2 schematically depicts the bonding steps of the present invention.

The process steps that are employed to create assembly 2 with a strong bond between metal part 4 and ceramic part 6 are schematically represented in FIG. 2. First, the surfaces to be bonded are prepared in step 20 by machining to assure that they will intimately conform to each other during bonding. The surfaces are smoothed and cleaned.

In step 22, component assembly 2 is prepared with interlayer material 8 between metal part 4 and ceramic part 6. In step 24, force 10 is applied to compress interlayer material 8 between metal part 4 and ceramic part 6. Force 10 is sufficient to create intimate contact between the parts. Force 10 is applied to assure that a strong bond is formed between metal part 4 and ceramic part 6 thus creating a hermetic seal between the two parts.

In step 26 the assembly to be heat processed is placed in a furnace in a non-reactive environment, which is preferably vacuum, but which can be argon atmosphere in an alternative embodiment. A vacuum is applied before the furnace is heated to the processing temperature in step 28. A preliminary holding temperature may be used to allow the thermal mass of the parts to achieve equilibrium before proceeding with heating. The process temperature is lower than the melting point of metal part 4, but greater than the temperature of the eutectic formed between the metals of the interlayer material 8. In a preferred embodiment, the vacuum is $10^{-5}$ to $10^{-7}$ torr, to assure that the interlayer material 8 and metal part 4 do not oxidize. Component assembly 2 is held at the selected temperature, which is typically between approximately 960° and 1080° C., for approximately 1 to 60 minutes, while force 10 continues to be exerted on interlayer material 8. The exact time, temperature and pressure are variable to achieve a hermetic and strong bond of metal part 4 with ceramic part 6. For example, in a preferred embodiment, a tetragonal zirconia polycrystal, TZP, part is bonded to a platinum part in vacuum of $10^{-5}$ torr at approximately 1060° C. for 10 minutes with a pressure of approximately 20 to 800 psi on a 50% by weight nickel and 50% titanium foil of approximately 0.002 inches thickness. Alternately, the foil is 67% titanium and 33% nickel, such as Tini-67®. One source of such materials is Morgan Advanced Ceramics. In some cases the foil may be an alloy, although a laminate material has been demonstrated to effect a strong bond under the conditions demonstrated herein.

The furnace is cooled and component assembly 2 is cooled to room temperature in step 30. In optional step 32, component assembly 2 is cleaned by being placed in a bath, after thermal processing is complete, to assure removal of all nickel and nickel salts. This bath is preferably an acid bath that etches the exposed surfaces of component assembly 2. In a preferred embodiment, the bath is nitric acid. Removal of nickel and nickel salts in the bath etch insures that component assembly 2 is biocompatible. Nickel and nickel salts can be detrimental to living animal tissue. In the preferred embodiment, however, all of the nickel that is introduced as interlayer material 8 is combined with the titanium or platinum and is tied up to be unavailable as free nickel or as a nickel salt.

Component assembly 2 is biocompatible after proper bonding and processing. Metal part 4, ceramic part 6, and interlayer material 8 are selected so as to be compatible with the environment in a living body. Hence, metal part 4 is preferably a platinum alloy and ceramic part 6 is preferably TZP.

In a preferred embodiment, component assembly 2 is either an electrical sensor or an electrical stimulator that is implanted in a human body, although it could equally well be implanted in any animal. It must survive long periods in the hostile environment of a living body, which is basically a warm saline solution. In a preferred embodiment, component assembly 2 is either a sensor or stimulator comprised of a hollow ceramic tube that contains various electronic components that is bonded to a metal electrode end. The component assembly must be watertight; hence, the bond is hermetic, resisting salt-water intrusion as well as growth of living tissue into the metal-to-ceramic bond joint.

Further, component assembly 2 does not corrode while implanted in the body. The materials are chosen such that post-bonding they are not susceptible to corrosion either individually or in the as-bonded state. Component assembly 2 resists electrolytic corrosion as well as crevice corrosion, because resistant materials are selected for component assembly 2.

Obviously, many modifications and variations of the present invention are possible in light of the above teachings. It is therefore to be understood that, within the scope of the appended claims, the invention may be practiced otherwise than as specifically described.

What is claimed is:

1. A component assembly comprising:
   a ceramic part;
   a metal part comprised of a noble metal; and
   a titanium-nickel interlayer material disposed between and in contact with a surface of the ceramic part and a surface of the metal part wherein the ceramic part and the metal part are bonded together by means of said titanium-nickel interlayer material.

2. The component assembly of claim 1 wherein said titanium-nickel interlayer material being a laminate foil.

3. The component assembly of claim 1 wherein said component assembly being biocompatible to be suitable for use in living tissue.

4. The component assembly of claim 1 wherein said titanium-nickel interlayer being comprised of 50% nickel and 50% titanium.

5. The component assembly of claim 1 wherein said titanium-nickel interlayer being comprised of 67% titanium and 33% nickel.

6. The component assembly of claim 1 wherein said ceramic part being selected from the group consisting of alumina, titania, zirconia, stabilized-zirconia, partially-stabilized zirconia, tetragonal zirconia polycrystal, magnesia-stabilized zirconia, ceria-stabilized zirconia, calcia-stabilized zirconia, and yttria-stabilized zirconia.

7. The component assembly of claim 1 wherein said noble metal being selected from the group consisting of platinum, iridium, palladium, ruthenium, rhodium, and their respective alloys.

8. The component assembly of claim 1 wherein said interlayer material being capable of forming a liquidus and creating a bond between said metal part and said ceramic part subsequent to the assembly being heated above a pre-selected temperature.

9. The component assembly of claim 8 wherein the pre-selected temperature being greater than the liquidus point of the interlayer material and less than the melting point of the metal part.

10. The component assembly of claim 1 wherein said interlayer material having a thickness no greater than approximately 0.003 inches.

11. The component assembly of claim 1 wherein said interlayer material being a thin coating of titanium-nickel disposed on at least one of the surface to be bonded together.

12. The component assembly of claim 1 wherein said interlayer material being a thin coating of titanium-nickel disposed on at least one of the surfaces to be bonded together by means of electroless plating or electroplating.

13. The component assembly of claim 1 wherein
said interlayer material being a thin coating of titanium-nickel that is disposed on at least one of the surfaces to be bonded together by means of depositing metallic beads or metallic powder on the surfaces.

14. The component assembly of claim 1 wherein
said interlayer material being a thin coating of titanium-nickel that is disposed on at least one of the surfaces to be bonded together by means of a thermal process selected from the group consisting of sputtering, evaporating, and ion beam enhanced deposition.

15. The component assembly of claim 1 wherein
said component assembly being hermetic.

16. A method of hermetically sealing a ceramic and metal component assembly, comprising the steps of:
selecting a ceramic part;
selecting a noble metal part;
selecting an interlayer material being compatible with said ceramic part, said interlayer material being capable of forming alloys, intermetallics or solid solutions with said metal part, said interlayer material having a liquidus temperature and said noble metal part having a melting point;
interposing said interlayer material between said ceramic part and said metal part;
applying a force to said ceramic part and said metal part to place said interposed interlayer material in compression;
placing said assembly in a non-reactive atmosphere;
heating said assembly to a bonding temperature between said liquidus temperature of said interlayer material and said melting point of said noble metal part;
holding said assembly at said bonding temperature for a predetermined time to form a bond between said ceramic part and said noble metal part; and
cooling the assembly.

17. The method of claim 16 wherein
said step of selecting the interlayer material is selecting a laminate material.

18. The method of claim 16 wherein
said step of applying the force creates compression between 20 and 2000 psi.

19. The method of claim 16 wherein
said step of selecting the ceramic part is selecting from the group consisting of alumina, titania, zirconia, stabilized-zirconia, partially-stabilized zirconia, tetragonal zirconia polycrystal, magnesia-stabilized zirconia, ceria-stabilized zirconia, yttria-stabilized zirconia, and calcia-stabilized zirconia.

20. The method of claim 16 wherein
said step of selecting the interlayer material is selecting a material comprised of titanium-nickel.

21. The method of claim 16 wherein
said step of selecting the interlayer material is selecting approximately 0.003 inches or less thick foil.

22. The method of claim 16 further comprising the step of applying said interlayer material chemically.

23. The method of claim 16 further comprising the step of applying said interlayer material thermally.

24. The method of claim 16 further comprising the step of applying said interlayer material in the form of metallic beads.

25. The method of claim 16 further comprising the step of applying said interlayer material in the form of metallic powder.

26. The method of claim 16 further comprising the step of placing said assembly in a vacuum atmosphere between approximately 10–5 to 10–7 torr.

27. The method of claim 16 wherein
the holding said bonding temperature being between approximately 960° C. and 1080° C.

28. The method of claim 16 wherein
the holding said predetermined time is between approximately 1 and 60 minutes.

29. The method of claim 16 additionally comprising the step of
cleaning said component assembly after bonding to remove toxic materials that are harmful to living tissue.

30. The method of claim 29 additionally comprising the step of
cleaning said component assembly after bonding by placing it in an acid bath.

31. A method of bonding a noble metal part to a ceramic part making a hermetically sealed component assembly, comprising the steps of:
selecting said ceramic part from the group comprised of tetragonal zirconia polycrystal ceramic;
selecting said metal part from the group consisting of platinum, iridium, palladium, ruthenium, rhodium, and their respective alloys;
interposing a laminate titanium-nickel foil between said ceramic part and said metal part;
applying a force to said ceramic part and said metal part to place said titanium-nickel foil in compression;
placing said component assembly in a non-reactive atmosphere;
heating said component assembly to between approximately 960° C. and 1080° C. for between approximately 1 and 60 minutes; and cooling said component assembly.

32. The method of claim 31 wherein
said step of interposing a foil is interposing a foil comprised of approximately equal amounts of nickel and titanium.

33. The method of claim 31 wherein
said step of interposing a foil is interposing a foil comprised of approximately twice as much titanium as nickel.

34. A method of bonding a ceramic part to a metal part, having a melting point, to form a component assembly for placement in living tissue in which an interlayer material, having a liquidus temperature, is placed between the ceramic part and the metal part, applying a compressive force of 20 to 2000 psi to said ceramic part and said metal part placing said interlayer material in compression, said interlayer material capable of forming alloys, intermetallics or solid solutions with said metal part, and in which said component assembly is placed at a bonding temperature, for a predetermined time, that is less than the melting point of said metal part, but greater than the liquidus temperature of said interlayer material, and selecting said ceramic part from the group consisting of alumina, titania, zirconia, stabilized-zirconia, partially-stabilized zirconia, tetragonal zirconia, magnesia-stabilized zirconia, ceria-stabilized zirconia, yttria-stabilized zirconia, and calcia-stabilized zirconia, wherein the improvement comprises:
selecting said metal part from a noble metal;
selecting said interlayer material to be titanium-nickel; and selecting said bonding temperature between approximately 960° C. and 1080° C.

35. The method of claim 34 wherein
said noble metal being selected from the group consisting of platinum, iridium, palladium, ruthenium, rhodium, and their respective alloys.

36. The method of claim 34 wherein
said selecting the interlayer material is selecting a laminate material.

37. The method of claim 34 wherein
said selecting the interlayer material is selecting said interlayer material comprised of about equal proportions of nickel and titanium.

38. The method of claim 34 wherein
said step of selecting the interlayer material is selecting said interlayer material comprised of about twice as much titanium as nickel.

\* \* \* \* \*